United States Patent [19]

Ander et al.

[11] Patent Number: 5,365,441
[45] Date of Patent: Nov. 15, 1994

[54] VEHICULAR WHEEL SPIN CONTROL TECHNIQUES

[75] Inventors: Anthony T. Ander, Plymouth; Andrew A. Adamczyk; Davorin Hrovat, both of Dearborn; Lee-Fei Chen, Ann Arbor, all of Mich.

[73] Assignee: Ford Motor Company, Dearborn, Mich.

[21] Appl. No.: 937,333

[22] Filed: Aug. 31, 1992

[51] Int. Cl.⁵ .............................................. B60K 28/16
[52] U.S. Cl. ............................... 364/426.03; 180/197; 123/333; 123/481
[58] Field of Search ............... 364/426.02, 426.03; 180/197; 123/332, 333, 481

[56] References Cited

U.S. PATENT DOCUMENTS

| | | | |
|---|---|---|---|
| 4,721,176 | 6/1988 | Kabasin et al. | 180/197 |
| 4,856,610 | 8/1989 | Leiber et al. | 180/197 |
| 4,873,638 | 10/1989 | Shiraishi et al. | 180/197 |
| 4,873,639 | 10/1989 | Sato et al. | 180/197 |
| 4,971,164 | 11/1990 | Fujita et al. | 180/197 |
| 5,022,483 | 6/1991 | Tsuyama et al. | 180/197 |
| 5,201,383 | 4/1993 | Kitagawa et al. | 364/426.03 |
| 5,213,178 | 5/1993 | Polidan et al. | 364/426.03 |
| 5,241,478 | 8/1993 | Inoue et al. | 364/426.02 |
| 5,248,010 | 9/1993 | Yagi et al. | 180/197 |
| 5,281,008 | 1/1994 | Kawamura et al. | 364/426.03 |
| 5,283,742 | 2/1994 | Wazaki et al. | 180/197 |

OTHER PUBLICATIONS

SAE Technical Paper Series, "The Integrated Brake and Stability Control System of the new BMW 850i," H. J. Kraft et al., Feb. 20, 1990, pp. 123-131.

*Primary Examiner*—Gary Chin
*Attorney, Agent, or Firm*—Peter Abolins; Roger L. May

[57] ABSTRACT

Techniques for controlling the spin of driven wheels of a vehicle also including non-driven wheels and an engine controlled by a spark angle and/or throttle position. The spark angle is controlled by a signal responsive to a slip error signal and a slip error derivative signal in order to alter the spark angle in a manner that controls the spin of the driven wheels. The throttle position is controlled by a throttle position control signal that is responsive to a slip error signal, a slip error derivative signal, and a slip error integration signal, in order to adjust the throttle position in a manner that controls the spin of the driven wheels. Wheel spin also can be controlled by the combination of a spark angle control signal and a throttle position control signal.

21 Claims, 3 Drawing Sheets

VEHICULAR WHEEL SPIN CONTROL TECHNIQUES

FIELD OF THE INVENTION

This invention is directed to techniques for controlling the spin of drive wheels of a vehicle. More particularly, the invention is directed to such techniques in which spark angle and/or throttle position are adjusted to control wheel spin.

BACKGROUND OF THE INVENTION

Those who drive vehicles on ice frequently have trouble controlling the spin of the vehicle's drive wheels. Ice severely reduces the traction between the drive wheels and the road surface. As a result, even a small amount of torque applied to the drive wheels tends to cause them to spin. If the spin becomes severe, the vehicle can be difficult to control.

There have been attempts to control vehicular wheel spin in the past. The one such approach is shown in U.S. Pat. No. 5,022,483 filed in the name of Tsuyama et al. and issued Jun. 11, 1991 (hereafter the "'483 patent"). Such attempts have failed to provide the degree of control needed by ordinary drivers under icy road conditions. For example, as explained in column 11, lines 61–65 of the '483 patent, the spark angle is altered according to the slip value of a driven wheel. The greater the slip value, the greater the correction of the spark angle. The applicants have found that such elementary spark angle control is insufficient to provide a degree of wheel spin control that will satisfy the needs of ordinary drivers. For example, relying on slip value alone creates problems during typical operating conditions.

Accordingly, it is the primary object of the present invention to provide improved techniques for controlling the spin of driven wheels of a vehicle that also includes non-driven wheels and an engine controlled by spark angle.

Another object of the invention is to provide such techniques for vehicles that also include an engine controlled by throttle position.

SUMMARY OF THE INVENTION

According to a first aspect of the invention, a method is provided for controlling the spin of the driven wheels of a vehicle that also includes non-driven wheels and an engine controlled by spark angle. In such a method, the applicants have discovered that wheel spin can be controlled with improved accuracy by providing first and second speed signals representative of the angular speed of the driven wheels and non-driven wheels of the vehicle, respectively. The first and second speed signals are used to generate a slip error signal. A slip error derivative signal proportional to the derivative of the slip error signal also is generated. The slip error derivative signal is at least approximately proportional to the slope of a curve which plots slip error versus time. The spark angle of the vehicle is then controlled by a signal responsive to both the slip error signal and the slip error derivative signal.

According to another aspect of the invention, the slip error signal is generated by generating a slip signal proportional to the difference between the angular speed of the driven wheels and the angular speed of the nondriven wheels. A desired slip signal proportional to a desired difference between the angular speed of the driven wheels and the angular speed of the nondriven wheels is then generated. The slip error signal then is made proportional to the difference between the value of the slip signal and the value of the desired slip signal.

According to another aspect of the invention, the spin of the driven wheels of a vehicle of the type previously described also can be controlled by adjusting throttle position. According to this technique, in addition to generating a slip error signal and a slip error derivative signal of the foregoing type, a slip error integration signal also is generated. The slip error integration signal is at least approximately proportional to the integral of the slip error signal over a predetermined time period. The throttle position is then controlled in response to the slip error signal, slip error derivative signal and the slip error integration signal.

According to another aspect of the invention, the foregoing types of spark angle and throttle position control can be combined in order to provide still more precise control over wheel spin.

Use of the foregoing techniques offers significant advantages that result in improved vehicular wheel spin control. Use of derivative control with spark adjustment improves the response of the system, as well as system damping, leading to increased directional control and reduction of surge oscillations on ice and similar slippery surfaces.

BRIEF DESCRIPTION OF DRAWINGS

The detailed description of certain preferred embodiments of the invention is provided below with reference to the accompanying drawings, wherein the same reference numeral is used for a given feature in all figures.

FIG. 1 is derived from FIG. 1 of the '483 patent, and like numbers refer to like parts in the '483 patent, which is incorporated by reference.

DETAILED DESCRIPTION OF CERTAIN PREFERRED EMBODIMENTS

Figure 1:
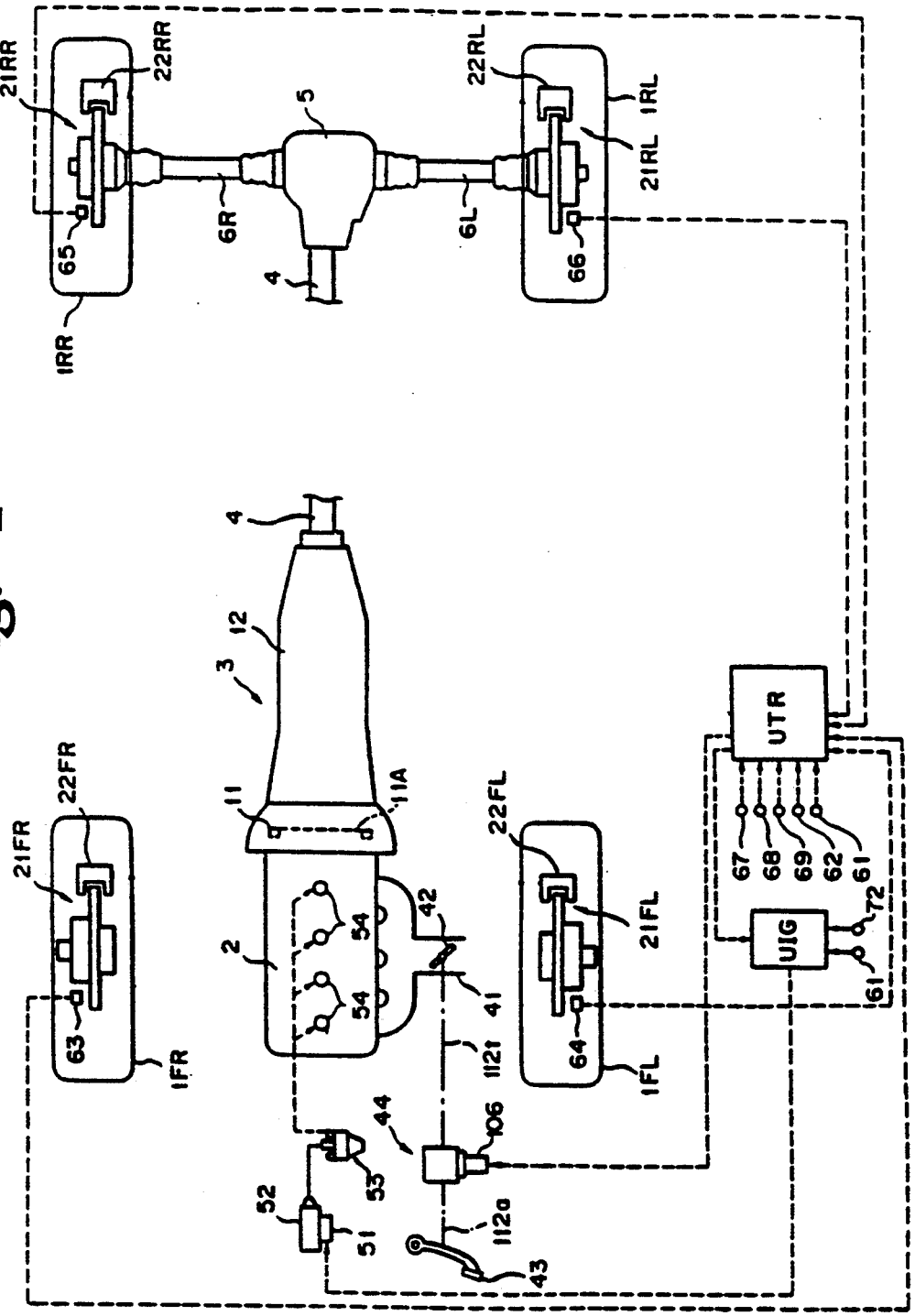
FIG. 1 is a fragmentary, schematic view of an exemplary automobile chassis in which a preferred form of the present invention may be used to advantage.

Referring to FIG. 1, a preferred form of the invention may be used to advantage in an exemplary automobile employing a rear wheel drive system in which a left hand front wheel 1FL and a right hand front wheel 1FR are undriven wheels, and a left hand rear wheel 1RL and a right hand rear wheel 1RR are driven wheels. An engine 2 loaded onto a front portion of the vehicle chassis generates torque that is transmitted through an automatic transmission 3, a propeller shaft 4 and a differential gear 5. In response to differential gear 5, a left hand drive shaft 6L operates a left hand rear wheel 1RL, and a right hand drive shaft 6R operates a right hand rear wheel 1RR.

Automatic transmission 3 includes a torque converter 11 that has a lockup clutch 11A of the hydraulically operative type. A multiple shifting gear train 12 is of a hydraulically operative type that is known to those skilled in the art.

As shown in FIG. 1, front wheels 1FR and 1FL and rear wheels 1RR and 1RL are provided with brakes 21FR, 21FL, 21RR and 21RL, respectively. The wheels 1FR, 1FL, 1RR and 1RL are fitted with calipers 22FR, 22FL, 22RR and 22RL.

In order to control excessive wheel slip, a control unit UTR generates signals that result in the reduction of torque generated by the engine in order to reduce the torque applied to the driven rear wheels 1RL and 1RR. A throttle valve 42 is disposed in an intake air passage 41 for engine 2. Valve 42 is connected to an accelerator pedal 43 through a mechanism 44 including accelerator wires 112a and 112t. The throttle valve also is positioned by a motor 106 which is responsive to control unit UTR.

A control unit UIG is provided for controlling the spark timing of the engine. Control unit UIG determines the spark timing based on a signal indicating throttle opening angle received from a sensor 61 and based on a signal indicating the number of revolutions of the engine received from a sensor 72. The spark timing determined by unit UIG is transmitted to an igniter 51 and an ignition coil 52. A high voltage secondary current from coil 52 is fed to spark plugs 54 through a distributor 53.

Preferably, units UTR and UIG are combined into a single controller, such as the electronic engine controller (EEC) manufactured by Ford Motor Company.

In order to control the spin of rear wheels 1RR and 1RL, control unit UTR operates motor 106 in order to properly adjust the throttle opening angle and sends signals to unit UIG to properly adjust the spark angle. Control unit UTR is provided with inputs of signals from sensors 63–66 for sensing each of the wheel speeds, a signal of the throttle opening angle from a sensor 61, a signal of vehicle speed from a sensor 62, a signal of the accelerator opening angle from sensor 67, a signal of an opening angle for motor 106 from a sensor 68 and a signal of a steered angle of the steering wheel from a sensor 69. Each of the foregoing aspects of the exemplary automobile shown in FIG. 1 is more particularly described in the '483 patent.

Figure 2:
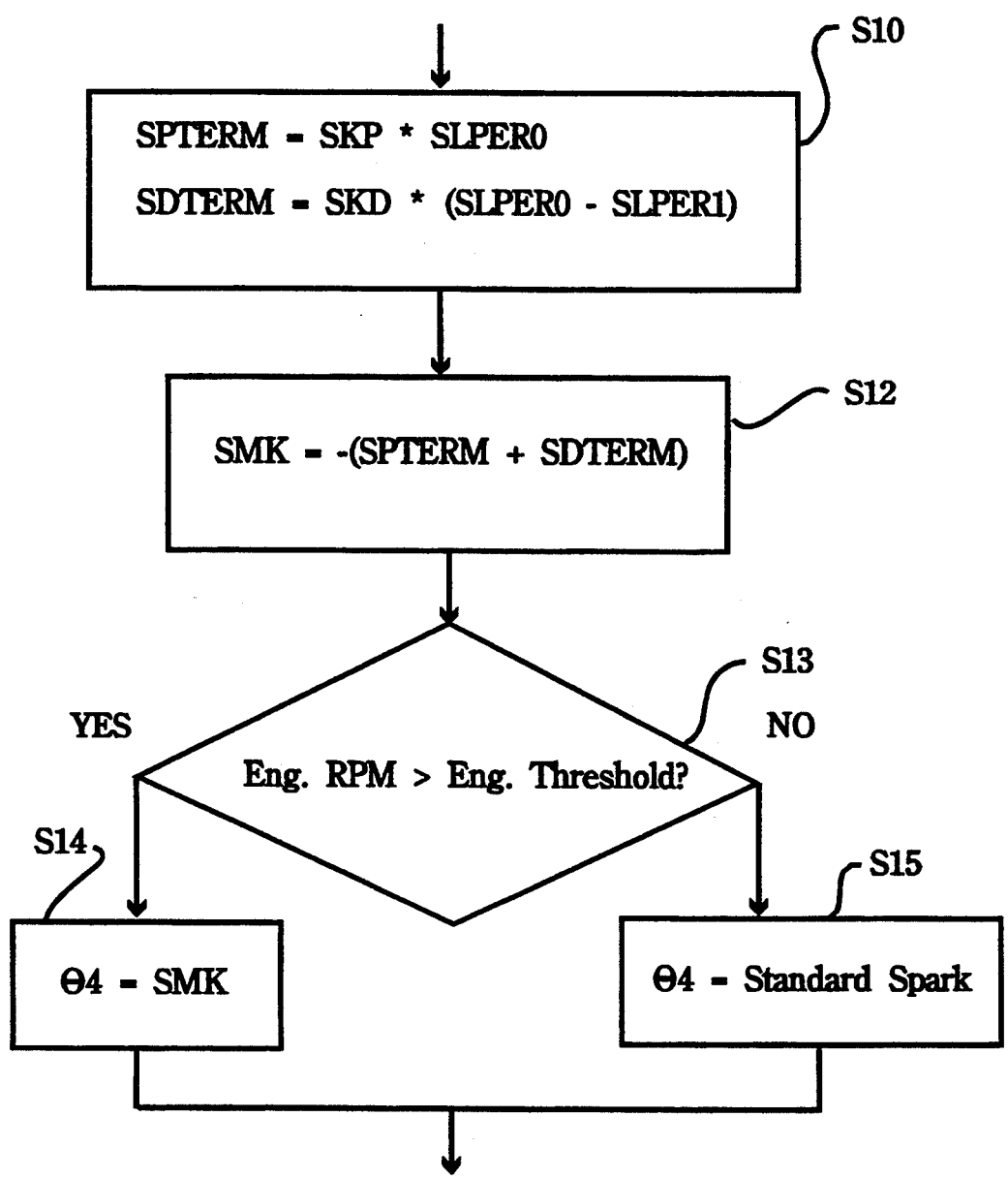
FIG. 2 is a flow chart illustrating the operation of an exemplary controller operating in accordance with a preferred embodiment of the present invention in order to control wheel spin by adjusting the spark angle of an exemplary engine.

Referring to FIG. 2, a preferred form of the present invention periodically generates a slip error signal (SLPER). In order to generate SLPER, the signals from sensors 65 and 66 indicating the angular speed of rear wheels 1RR and 1RL are processed in order to generate a first speed signal representative of the average angular speed of rear wheels 1RR and 1RL. The signals from sensors 63 and 64 that represent the angular speed of undriven front wheels 1FR and 1FL are averaged in order to generate a second speed signal representative of the angular speed of the non-driven front wheels. Control unit UTR is programmed to generate a slip signal proportional to the difference between the angular speed of the driven wheels and the angular speed of the non-driven wheels. That is, the slip signal is proportional to the value of the first speed signal minus the value of the second speed signal.

A memory location in unit UTR stores a desired slip signal representing a desired difference between the angular speed of the driven wheels and the angular speed of the non-driven wheels (i.e., a desired difference between the values of the first and second speed signals). This is an important feature which enables the system to automatically provide some tractive force by the driven wheels while controlling excessive spin. Slip error signal SLPER is proportional to the difference between the value of the slip signal and the value of the desired slip signal.

Those skilled in the art will recognize that the slip error signal (SLPER) is calculated at predetermined points in time that are separated by a predetermined and fixed time duration. Preferably, the slip error signal is recalculated during each calculation cycle of unit UTR, i.e., about every 20 milliseconds. The slip error signal for the current calculation cycle is indicated by SLPER0.

As soon as signal SLPER0 indicates an excessive spin condition, the spark angle is forced to a threshold of value. Preferably, control unit UTR sends a signal to unit UIG which retards the nominal spark angle normally produced by unit UIG about 30°. The exact amount of spark angle retard depends on the specific engine load/RPM conditions. The 30° retard is maintained for approximately 100 milliseconds. After the 100 millisecond interval, the spark angle adjustment signal produced by unit UTR is calculated by the method shown in FIG. 2.

In step S10, unit UTR is programmed to set the value SPTERM equal to a control gain constant (SKP) multiplied by the slip error value for the current calculation cycle (SLPER0). As a result, SPTERM is proportional to the current slip error.

Still referring to step S10, the value SDTERM is set equal to a control gain constant SKD multiplied by the difference between the current slip error value (SLPER0) and the slip error value for the next preceding calculation cycle (SLPER1). Those skilled in the art will understand that the value SDTERM is at least approximately proportional to the derivative of the slip error signal taken as a function of time. This is an important feature which enables more precise control over drive wheel spin compared with the prior art.

Referring to step S12 of FIG. 2, the values SPTERM and SDTERM are summed in order to determine the value SMK.

In step S13, the engine RPM received at input 72 (FIG. 1) is compared with an engine threshold value. The threshold value is set high enough to prevent engine stalling when the spark is adjusted in order to control wheel spin. In the case of a four cylinder engine, a threshold value of 850 RPM has been found to be satisfactory.

As shown in step S14, if the current engine RPM exceeds the threshold value, value Θ4 is set equal to value SMK. As shown in step S15, if the current engine RPM is less than the threshold value, value Θ4 is set equal to a value that will result in no adjustment of the standard spark angle signal generated by unit UIG.

The unique method steps shown in FIG. 2 can be substituted for step R25 shown in FIG. 10 of the '483 patent in order to achieve improved spin control. As shown in step S14, the spark angle control signal Θ4 is responsive to both the slip error signal and the slip error derivative signal. As shown in FIG. 1, the spark angle control signal is transmitted to unit UIG which uses it in order to alter the spark angle in a manner that controls wheel spin. Using the steps shown in FIG. 2 improves the speed of response, as well as system damping.

Figure 3:
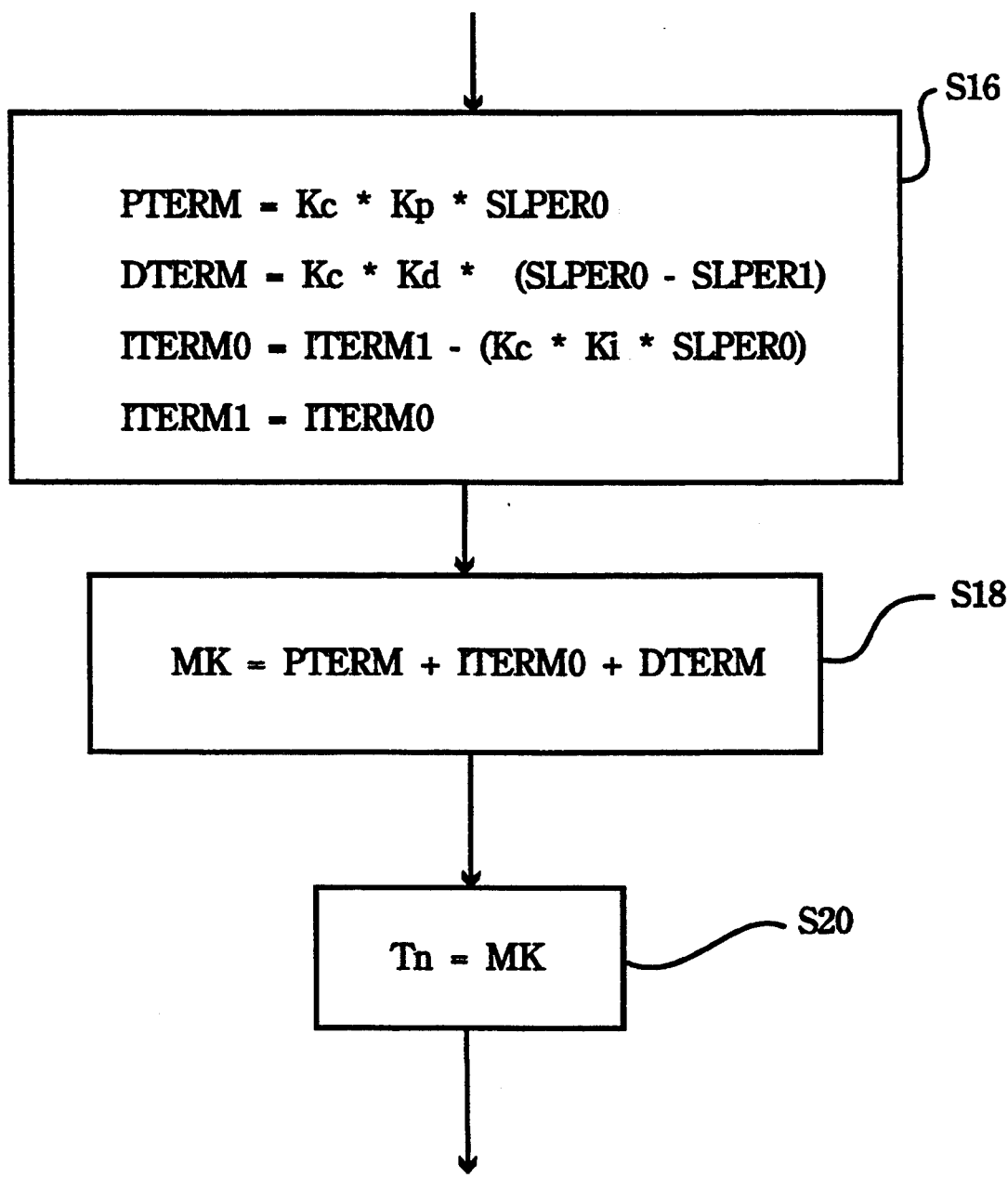
FIG. 3 is a flow chart illustrating the operation of an exemplary controller operating in accordance with a preferred embodiment of the present invention in order to control wheel spin by adjusting throttle position of an exemplary engine.

Referring to FIG. 3, control unit UTR preferably is programmed to perform the unique operating steps S16, S18 and S20 in order to control excessive wheel spin by adjusting throttle position.

Referring to step S16, the value PTERM is set equal to a control gain constant Kc multiplied by another control gain constant Kp multiplied by the current slip error value (SLPER0). As a result, PTERM is proportional to the slip error value. Derivative value DTERM is set equal to control gain constant Kc multiplied by another control gain constant Kd multiplied by the difference between the slip error value for the current calculation cycle (SLPER0) and the slip error value for the preceding calculation cycle (SLPER1). Those skilled in the art will recognize that DTERM is at least approximately proportional to the derivative of the slip error value taken as a function of time. This is an important feature which enables improved wheel spin control by proper positioning of the throttle valve.

Still referring to step S16, current integral term ITERM0 is set equal to the stored value of ITERM from the preceding calculation cycle (ITERM1) minus a term consisting of a control gain constant Kc multiplied by another control gain constant Ki multiplied by the current slip error value (SLPER0). The value of ITERM1 is then set equal to the current ITERM value (ITERM0).

Those skilled in the art will recognize that the repeated calculation of ITERM over time is at least approximately proportional to the integral of the slip error taken as a function of time. The number of cycles over which the value ITERM is accumulated can be varied depending on the accuracy of the integral desired and the particular application intended.

Referring to step S18 of FIG. 3, the value MK is set equal to the sum of the values PTERM, ITERM0 and DTERM. Referring to step S20, the value MK is set equal to the value Tn. Those skilled in the art will recognize that the value Tn can be substituted in step S34 shown in FIG. 6 of the '483 patent in order to control the position of throttle 42 through the operation of motor 106.

The various control gain constants shown in FIGS. 2 and 3 can readily be calculated by those skilled in the art.

The unique process steps shown in FIG. 3, whereby throttle position is determined based on proportional, derivative and integral terms, provides for improved operation compared with the more elementary control described in the '483 patent. In particular, there are improvements in speed of response as well as system damping.

Those skilled in the art will recognize that the unique steps shown in FIGS. 2 and 3 can be combined to provide simultaneous adjustment of both the throttle position and spark angle in order to automatically control undesired wheel spin. Substituting the unique steps described in FIGS. 2 and 3 in place of step R25 (FIG. 10) and step P34 (FIG. 6), respectively, is shown in the '483 patent, is one method of achieving such simultaneous adjustment.

The various preferred versions or embodiments of the invention described in detail above are intended only to be illustrative of the invention. Those skilled in the art will recognize that modifications, additions and substitutions can be made in the various features and elements of the invention without departing from the true scope and spirit of the invention. The following claims are intended to cover the true scope and spirit of the invention.

We claim:

1. A method of controlling the spin of driven wheels of a vehicle also including nondriven wheels and an engine controlled by spark angle comprising in combination the steps of:
    generating a first speed signal representative of the angular speed of said driven wheels;
    generating a second speed signal representative of the angular speed of said nondriven wheels;
    generating a slip error signal responsive to said first speed signal and said second speed signal;
    generating a slip error derivative signal at least approximately proportional to the derivative of said slip error signal;
    generating a spark angle control signal responsive to said slip error signal and said slip error derivative signal; and
    controlling the spark angle in response to said spark angle control signal, whereby the degree of spark angle retardation is altered in order to control the spin of said driven wheels.

2. A method, as claimed in claim 1, and further comprising the step of retarding said spark angle by a predetermined value for a predetermined time period during the initial detection of excessive wheel spin of said driven wheels.

3. A method, as claimed in claim 1, wherein the step of generating said slip error signal comprises the steps of:
    generating a slip signal proportional to the difference between the angular speed of said driven wheels and the angular speed of said nondriven wheels;
    defining a desired slip signal proportional to a desired difference between the angular speed of said driven wheels and the angular speed of said nondriven wheels; and
    generating said slip error signal proportional to the difference between the value of the slip signal and the value of the desired slip signal.

4. A method, as claimed in claim 1, wherein the step of generating said slip error derivative signal comprises the step of generating at predetermined points in time a difference signal proportional to the difference between the value of the slip error derivative signal at a first point in time and the value of the slip error derivative signal at a second point in time prior to said first point in time.

5. A method, as claimed in claim 4, wherein the predetermined points in time are separated by a predetermined time duration.

6. A method, as claimed in claim 1, wherein the step of generating said spark angle control signal comprises a step of summing the slip error signal and the slip error derivative signal.

7. A method, as claimed in claim 1, wherein the step of controlling the spark angle is disabled if the speed of said engine is less than a predetermined threshold value.

8. A method of controlling the spin of driven wheels of a vehicle also including nondriven wheels and an engine controlled by throttle position comprising in combination the steps of:
    generating a first speed signal representative of the angular speed of said driven wheels;
    generating a second speed signal representative of the angular speed of said nondriven wheels;
    generating a slip error signal responsive to said first speed signal and said second speed signal;

generating a slip error derivative signal at least approximately proportional to the derivative of said slip error signal;

generating a slip error integration signal at least approximately proportional to the integral of said slip error signal over a predetermined time period;

generating a throttle position control signal responsive to said slip error signal, said slip error derivative signal and said slip error integration signal; and controlling said throttle position in response to said throttle position control signal, whereby the throttle position is altered in order to control the spin of said driven wheels.

9. A method, as claimed in claim 8, wherein the step of generating said slip error signal comprises the steps of:

generating a slip signal proportional to the difference between the angular speed of said driven wheels and the angular speed of said nondriven wheels;

defining a desired slip signal proportional to a desired difference between the angular speed of said driven wheels and the angular speed of said nondriven wheels; and generating said slip error signal proportional to the difference between the value of the slip signal and the value of the desired slip signal.

10. A method, as claimed in claim 8, wherein the step of generating said slip error derivative signal comprises the step of generating at predetermined points in time a difference signal proportional to the difference between the value of said slip error derivative signal at a first point in time and the value of said slip error derivative signal at a second point in time prior to the first point in time.

11. A method, as claimed in claim 10, wherein the predetermined points in time are separated by a predetermined time duration.

12. A method, as claimed in claim 8, wherein the step of generating said throttle position control signal comprises a step of summing said slip error signal and said slip error derivative signal.

13. A method, as claimed in claim 8, wherein the step of generating said slip error integration signal comprises the step of summing the values of the slip error integration signals occurring at predetermined points in time.

14. A method, as claimed in claim 13, wherein the predetermined points in time are separated by a predetermined time duration.

15. A method of controlling the spin of driven wheels of a vehicle also including nondriven wheels and an engine controlled by spark angle and throttle position comprising in combination the steps of:

generating a first speed signal representative of the angular speed of said driven wheels;

generating a second speed signal representative of the angular speed of said nondriven wheels;

generating a slip error signal responsive to said first speed signal and said second speed signal;

generating a slip error derivative signal at least approximately proportional to the derivative of said slip error signal;

generating a slip error integration signal at least approximately proportional to the integral of said slip error signal over a predetermined time period;

generating a spark angle control signal responsive to said slip error signal and said slip error derivative signal;

generating a throttle position control signal responsive to said slip error signal, said slip error derivative signal and said slip error integration signal; and controlling the spark angle in response to said spark angle control signal and controlling said throttle position in response to said throttle position control signal, whereby the degree of spark angle retardation and throttle position is altered in order to control the spin of said driven wheels.

16. A method, as claimed in claim 15, and further comprising the step of retarding said spark angle by a predetermined value for a predetermined time period during the initial detection of excessive wheel spin of said driven wheels.

17. A method, as claimed in claim 15, wherein the step of generating said slip error signal comprises the steps of:

generating a slip signal proportional to the difference between the angular speed of said driven wheels and the angular speed of said nondriven wheels;

defining a desired slip signal proportional to a desired difference between the angular speed of said driven wheels and the angular speed of said nondriven wheels; and generating said slip error signal proportional to the difference between the value of said slip signal and the value of said desired slip signal.

18. A method, as claimed in claim 15, wherein the step of generating said slip error derivative signal comprises the step of generating at predetermined points in time a difference signal proportional to the difference between the value of said slip error derivative signal at a first point in time and the value of said slip error derivative signal at a second point in time prior to the first point in time.

19. A method, as claimed in claim 18, wherein the predetermined points in time are separated by a predetermined time duration.

20. A method, as claimed in claim 15, wherein the step of generating said spark angle control signal comprises a step of summing said slip error signal and said slip error derivative signal.

21. A method, as claimed in claim 15, wherein the step of controlling the spark angle is disabled if the speed of said engine is less than a predetermined threshold value.

* * * * *